United States Patent [19]
Ankaitis

[11] Patent Number: 4,721,570
[45] Date of Patent: Jan. 26, 1988

[54] RBC WITH SOLIDS CONTACT ZONE

[75] Inventor: Raymond J. Ankaitis, Walnut Creek, Calif.

[73] Assignee: Envirex, Inc., Oakland, Calif.

[21] Appl. No.: 45,444

[22] Filed: May 4, 1987

Related U.S. Application Data

[63] Continuation-in-part of Ser. No. 826,657, Feb. 6, 1986, abandoned.

[51] Int. Cl.$^4$ .................................................. C02F 3/18
[52] U.S. Cl. ...................................... 210/619; 210/151; 210/195.3; 210/197
[58] Field of Search ............ 210/619, 150, 151, 195.3, 210/197, 615

[56] References Cited

U.S. PATENT DOCUMENTS

| | | | |
|---|---|---|---|
| 3,704,783 | 12/1972 | Antonie | 210/619 |
| 4,035,920 | 7/1977 | Torpey | 210/151 |
| 4,289,626 | 9/1981 | Knopp et al. | 210/619 |

FOREIGN PATENT DOCUMENTS

| | | | |
|---|---|---|---|
| 3016920 | 11/1981 | Fed. Rep. of Germany | 210/619 |
| 3126985 | 1/1983 | Fed. Rep. of Germany | 210/615 |

*Primary Examiner*—Benoit Castel
*Attorney, Agent, or Firm*—Michael, Best & Friedrich

[57] ABSTRACT

A method and apparatus for enhancing the settleability of suspended wastewater solids is provided for a wastewater treatment system comprising a primary clarifier apparatus, a compartmentalized, sequential secondary biological treatment apparatus such as a rotating biological contactor tank, and a secondary clarifier, wherein a portion of waste sludge from the clarifier is diverted to compartments of the rotating biological contactor tank to enhance the flocculation of the suspended waste solids. The diverted sludge particles serve as flocculation nuclei which promote settleability and lower turbidity once the effluent reaches the secondary clarifier.

6 Claims, 3 Drawing Figures

RBC WITH SOLIDS CONTACT ZONE

This application is a continuation-in-part of U.S. patent Application Ser. No. 826,657, filed Feb. 6, 1986 and now abandoned.

BACKGROUND OF THE INVENTION

The present invention relates to wastewater treatment systems, and more specifically, to those systems requiring a simple and inexpensive means for reducing effluent turbidity and increasing the settleability of suspended solids.

Conventional wastewater treatment systems comprise a primary clarifying means such as a settling tank, a secondary or biodegradative treatment means, such as a trickling filter or rotating biological contactor (RBC), and a secondary clarifying means such as a circular clarifier. Settled solids collected from the primary and secondary clarifiers are treated by dewatering, digestion, drying, etc. prior to ultimate disposal at a landfill or on agricultural lands.

The achievement of rapid and complete settling of suspended solids of both organic and inorganic composition has long been a major objective of treatment plant designers and operators. This dilemma is a result of the often conflicting process requirements of the biodegradative phase and the clarification phase.

For optimum biodegradation, wastewater is normally kept in an agitated, aerated condition to supply a suspending biomass with access to both air and an adequate food supply, the latter usually taking the form of suspended and soluable waste material. However, once the wastewater is transferred to the clarifier, essentially quiescent conditions prevail to enable the waste to settle out as soon and as completely as possible.

Additional means have been devised to enhance the transition between biodegradation and clarification, and to more completely remove suspended inorganic and organic solids from the final plant effluent. The industry term for this process is "the improvement of solids contact."

These additional means normally comprise some form of auxiliary treatment means, such as a holding tank between the biodegradation and clarification stages. The holding tank provides a site to enhance the settleability of wastewater solids without being subject to either the agitated environment of the biodegradation tank, or to disturbing the quiescent environment of the secondary clarifier.

Quite often, in order to remove adequate amounts of suspended matter from the effluent, this additional transition means takes the form of a filter, such as a sand filter similar to that disclosed in U.S. Pat. No. 3,587,861 to Ross, or a rotating microscreen drum of the type described in U.S. Pat. No. 4,038,187 to Saffran having a relatively fine mesh screen.

Unfortunately, these additional measures, be they holding tanks, filters or microscreens, require the construction of expensive tanks and other apparatus and, in the case of sand filters, are expensive to maintain. Thus, cost considerations often place this type of treatment out of the financial reach of many smaller communities.

This problem is compounded when state regulations require that treatment plant effluent not exceed a suspended solids concentration of 5–10 milligrams per litre of effluent. This additional level of treatment quality is more difficult, if not impossible, to achieve by conventional clarification processes. Thus, supplemental solids separation facilities become a costly necessity to treatment plants of all sizes.

Prior efforts to reduce the high cost of auxiliary treatment by combining the process of solids collection with biodegradation are exemplified by U.S. Pat. No. 3,575,849 to Torpey, who discloses the use of a secondary sedimentation tank after an aeration tank. The sedimentation tank is equipped with a plurality of RBC's near the surface, and a solids collection apparatus near the bottom of the tank to collect and transfer settled solids or sludge.

Conventional RBC's are used in secondary biological wastewater treatment processes. RBC's provide surfaces for the growth of a biomass which has the ability to absorb, adsorb, coagulate and oxidize undesirable organic constituents of the wastewater and to change them into unobjectionable forms of matter. The contactors are typically rotated partially submerged in wastewater in a treatment tank so that the surfaces are alternately exposed to the wastewater and to oxygen in the overlying atmosphere. A film of wastewater is carried into the air and trickles down the surfaces of the contactor while absorbing oxygen from the air. Organisms in the biomass remove dissolved oxygen and organic materials from the film of wastewater and unused dissolved oxygen in the wastewater film is mixed with the contents of the mixed liquor in the tank.

Conventional RBC's comprise a plurality of disks mounted on a rigid shaft in parallel orientation to each other and transverse to the flow of the effluent in the tank. The RBC disks are normally positioned to be submerged to one half their diameter in wastewater and the remaining half exposed to the ambient air to promote the growth of organisms on the disks. As the RBC rotates, the disks become covered with a biological slime which absorbs the undesirable constituents of the wastewater.

Torpey continually recirculates a majority of the settled sludge to the aeration tank for reuse in clarifying the wastewater (the excess sludge is conducted to disposal). This is necessary because the settled sludge contains active degradative organisms, which, if permanently removed from the aeration tank, would soon deplete the resident microbial population below the threshold necessary for effective biodegradation.

However, Torpey discloses the installation of RBC's in the clarification tank where they could not help but disrupt the settling process. Despite Torpey's assertions that the placement of the RBC's in the upper regions of the tank would not disrupt settling, experience has shown that disruption does occur. Furthermore, this assertion is indicative of Torpey's emphasis on the maximization of biodegradation, and explains his failure to address the need to enhance the physical settling of solids in the clarifier.

Later work in the RBC field has shown that RBC's are more effective in the secondary treatment tank than in the clarification process, and as such modern RBC's are usually not placed in clarification tanks. See for example U.S. Pat. Nos. 3,596,767 to Antonie and 3,886,074 to Prosser.

It has also become common practice to recirculate sludge from the clarifier back to the secondary treatment RBC tank to replenish the population of degradative biota. See for example U.S. Pat. No. 4,093,539 to Guarino, who, in conventional fashion, introduces recycled sludge at the influent end of the aeration tank.

From a biodegradative process standpoint, this is the optimal point of introduction. However, introduction at this point does not enhance solids contact, or the settling of suspended fine particles.

It is therefore a major objective of the present invention to provide a wastewater treatment apparatus which enhances solids settling, increases solids contact and lowers turbidity in the final effluent.

It is a further objective of the present invention to provide a wastewater treatment apparatus capable of increasing solids contact without requiring the construction of extensive additional facilities.

It is a still further objective of the present invention to provide a method of wastewater treatment whereby the step of tertiary filtration may be eliminated.

SUMMARY OF THE INVENTION

A wastewater treatment apparatus and method is provided for use with a treatment system comprising a primary clarification tank and a secondary staged treatment tank employing a sequence of individual RBC units. At least one RBC unit is contained in each stage or compartment. The wastewater enters the RBC tank through an inlet, and progresses through the sequence of RBC compartments, eventually reaching an effluent end. A conduit carries effluent from the effluent end to a secondary clarifier, which separates and collects settled solids or sludge from the final plant effluent.

More specifically, the present invention is concerned with enhancing the settling of solids in the clarifier by improving solids contact in the RBC tank. This is accomplished by diverting a portion of settled sludge from the clarifier to a compartment of the RBC tank near its effluent end.

The recirculated sludge particles are dispersed throughout the RBC compartment, where they serve as flocculation nuclei for smaller suspended particles of both organic and inorganic composition. In this manner, the solids become flocculated, which greatly enhances their settleability once they are transferred to the secondary clarifier.

DESCRIPTION OF THE DRAWINGS

The invention and its many attendant objects and advantages will be better understood by reference to the following drawings, wherein.

DESCRIPTION OF THE PREFERRED EMBODIMENT

Figure 1:
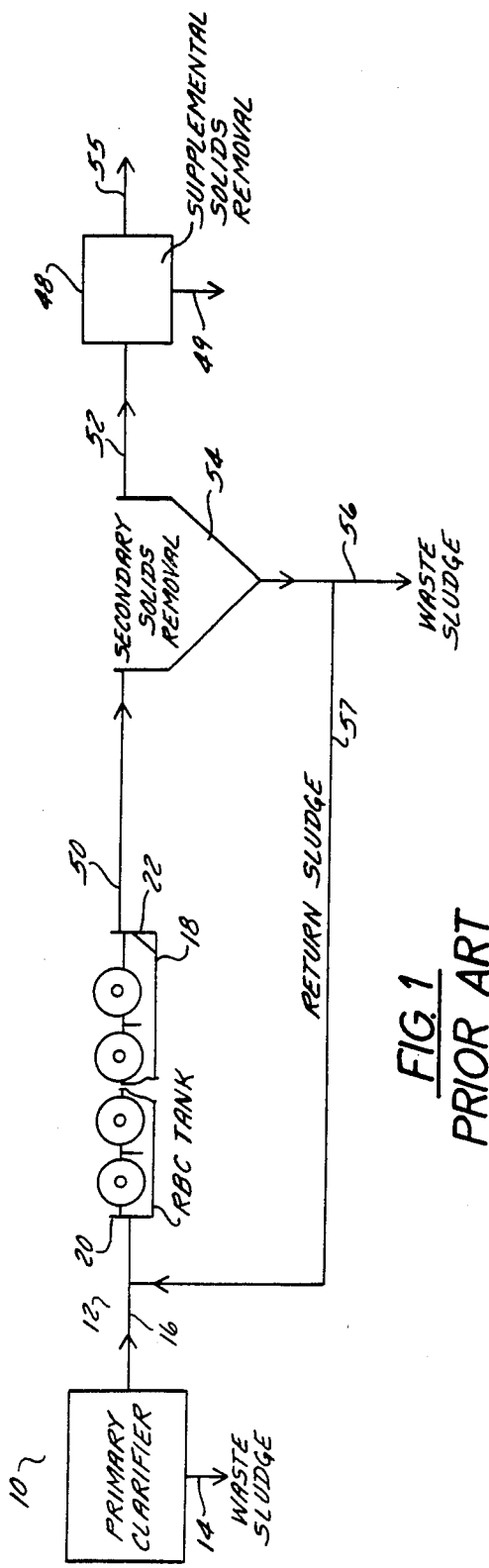
FIG. 1 is a schematic flow diagram of the prior art process, including a holding tank.

Referring now to the drawings, wherein like reference numerals indicate like features, the present invention is designed to be used in conjunction with a wastewater treatment plant comprising a primary treatment tank 10. Primary treatment usually involves the use of a settling tank or clarifier, and may include an aeration tank, but for the purposes of the present invention will encompass the use of any apparatus conventionally used for primary treatment. Primary effluent 12 is conveyed via pipeline 16 to RBC tank 18, comprised of an influent end 20, an effluent end 22, two sides 24 and a floor 26. Tank 18 may be manufactured from any suitable material such as concrete or steel. RBC tank 18 is divided into a series of compartments or stages 31 by rigid baffles 28 mounted to the sides 24 so as to be transverse to the flow of wastewater 25, running from influent end 20 to effluent end 22. Water flows from stage to stage through a narrow gap 27 between each baffle 28 and floor 26.

Each compartment 31 is equipped with one or more RBC units 32, each unit comprised in this example of a plurality of polymeric disks 34 mounted in parallel arrangement on a drive shaft 36. The RBC unit is provided with means to increase the available surface area for the growth of bacteria. In the type of disk RBC depicted in FIG. 3, a plurality of depressions 38 may be molded into the surface of disk 34 to provide this additional surface area. RBC units are found in many configurations, and the RBC disclosed in the present embodiment is provided for purposes of explanation only. An alternative RBC media design is disclosed in U.S. Pat. No. 4,549,962 to Koelsch.

RBC units rotate via the movement of shaft 36, which may be driven by a motor (not shown) or by the force of air supplied through underwater headers 40. Underwater headers 40 are provided with a source of pressurized air from a blower (not shown). This air is used to supply the submerged biota with a source of oxygen. In the preferred form of the invention, because of the mixing of oxygen with the waste caused by rotation of the RBCs as well as the introduction of forced air into the RBC tank through the underwater headers 40, the waste water in the RBC tank, and including the waste water in the last and second to last compartments, will have a dissolved oxygen content of at least 0.5 milligrams/liter and more normally a dissolved oxygen content of 2 milligrams/liter such that the organic material in the waste water will biologically degrade aerobically. The introduction of pressurized air into tank 18 also causes agitation of the suspended waste solids, which prevents their settling and ultimate stagnation. To prevent the accumulation of settled solids in unagitated portions of the tank, a fillet 42 may be placed in the corners of the compartments, as required.

As wastewater progresses from stage to stage toward the effluent end 22 of RBC tank 18, aerobic biodegradation of the waste continues and progressively greater amounts of organic carbon are removed. In the course of this treatment process, the RBC disks continuously slough off dead portions of the biota, thus increasing the amount of suspended solids in the tank. Consequently, despite the efficient removal of organic wastes, the RBC effluent contains a larger concentration of suspended solids than the influent. Conventional wastewater treatment systems transfer RBC effluent via conduit 50 to a secondary solids removal means 54 such as a clarifier.

Clarifier 54 separates a clarified effluent from collected solids, the effluent being passed through conduit 52 to the ambient body of water and the solids are conveyed to separate treatment via conduit 56. Usually, a portion of activated sludge is diverted to the influent end 20 of RBC tank 18 via conduit 57 to replenish the population of degradative biota. Unfortunately, in applications where stringent effluent regulations are in effect, the required amount of suspended particulate matter is not adequately removed by the clarifier 54. In these cases, the clarified effluent is passed to supplemental solids separation apparatus 48 via conduit 52, and conduit 55 becomes the final effluent exit point.

Supplemental apparatus 48 may take the form of any device designed to physically remove additional suspended solids of both organic and inorganic composition. Collected solids are passed through conduit 49 for further treatment. Examples of supplemental settling devices are sand filters and microscreens. Unfortunately, the construction and operation of these supplemental facilities often creates a significant drain on a treatment plant's finances.

Figure 2:
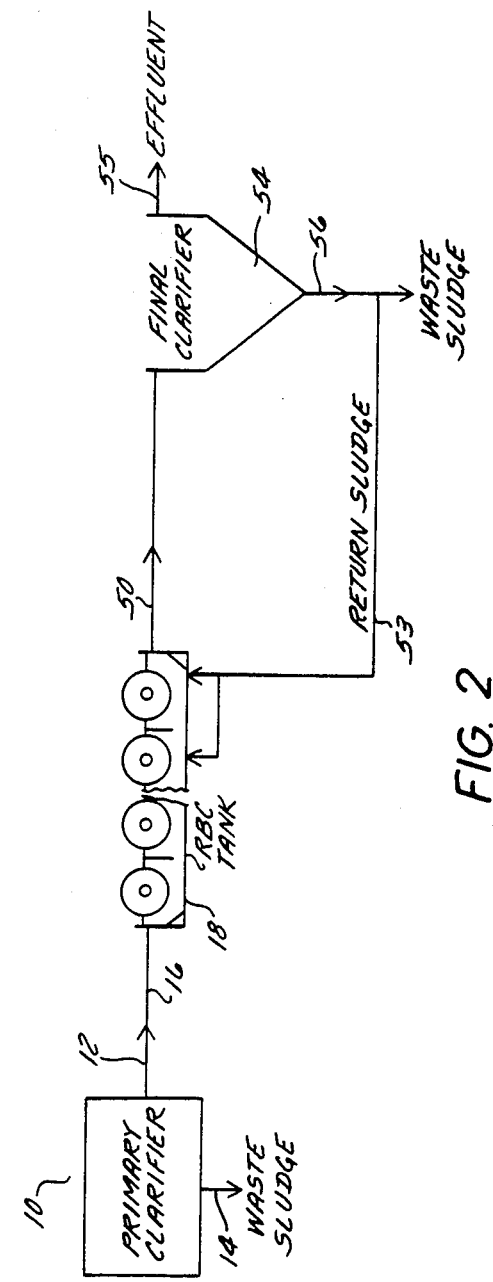
FIG. 2 is a schematic flow diagram of the process of the present invention.
Figure 3:
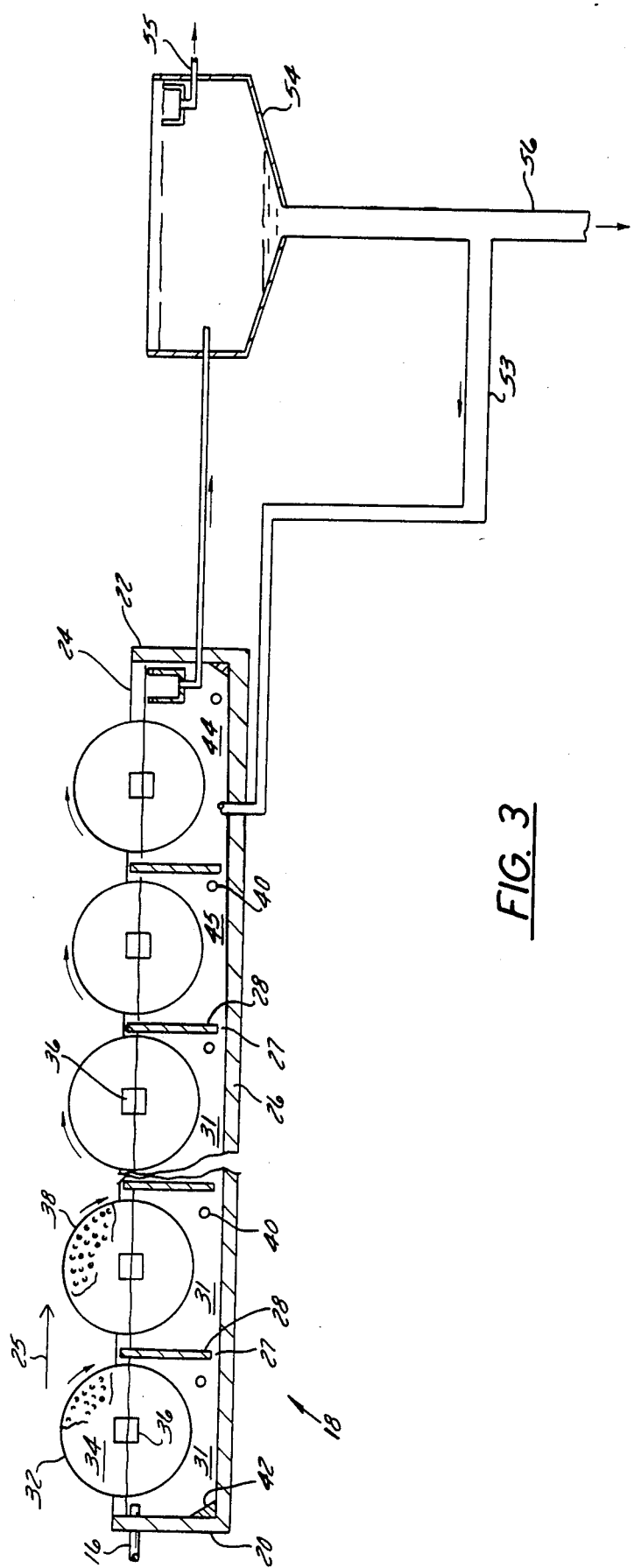
FIG. 3 is a sectional view of the RBC tank and clarifier of FIG. 2 embodying the present invention.

Referring now to FIGS. 2 and 3, the present invention provides a means for increasing solids contact so that clarification in the secondary clarifier 54 is enhanced to an extent which negates the need for supplemental treatment means 48. This increased solids contact is accomplished by diverting a small portion of waste sludge from clarifier conduit 56 into one of the compartments of RBC tank 18 which is located closer to effluent end 22. This diverted sludge is carried by conduit 53 to RBC tank 18.

FIG. 2 illustrates the concept of introducing the return sludge to either the last compartment 44 and/or the second to the last compartment 45. The preferred embodiment, illustrated in FIG. 3, depicts the introduction of the diverted sludge into the last compartment 44 of RBC tank 18. To achieve optimum solids adsorption, recirculated sludge is introduced near the rotating RBC unit. It is preferred that the recirculation of sludge into the RBC tank be at a rate which maintains a mixed liquor concentration of approximately 500 milligrams per liter or higher in the recirculated compartment.

Once the recirculated return sludge enters the effluent end of the RBC tank 18, it becomes dispersed into the agitated liquor of the recirculated RBC compartment. Suspended particles of waste sludge act as flocculation nuclei for suspended organic as well as inorganic fines. In this manner, the turbidity of the RBC effluent is significantly reduced, and final clarification is enhanced by the achievement of more rapid and more complete settling of fine particles.

It has been found that the present process produces a clearer effluent when the wastewater in the recirculated compartment is provided with a gentle agitation to enhance flocculation of the fine particles. Too vigorous an agitation will disrupt this flocculation process. The amount of agitation may be adjusted by varying RBC rotational velocity or aeration gas volume. In addition, the RBC tank should preferably be designed to provide the flocculating solids with a sufficiently long residence time to optimize this decrease in turbidity.

Thus, in contrast to conventional treatment systems exemplified by the Torpey system, described above, in which the waste sludge is recycled or returned to the *influent* end of the RBC tank to supplement the population of degradative organisms, the present invention discloses the concept of recycling the waste sludge to the *effluent* end of the RBC tank. The prime objective of this design is the provision of sludge particles as flocculation nuclei and the subsequent increased physical settling of organic as well as inorganic fine particles.

While particular embodiments of the present invention have been shown and described, it will be obvious to persons skilled in the art that changes and modifications might be made without departing from the invention in its broader aspects.

I claim:

1. In a wastewater treatment system, an apparatus for increasing solids contact and thus enhancing solids settling while negating the need for supplemental clarification means comprising:
    a source of primary effluent having a suspended solids component;
    an elongate tank having an influent end and an effluent end and containing a plurality of compartments arranged in series fashion to include a first compartment and a last compartment and constructed so that wastewater entering this first compartment at the influent end progresses gradually through the compartments to reach the last compartment at this effluent end;
    means for connecting the source of primary effluent to the elongate tank;
    means for maintaining a dissolved oxygen content of at least 0.5 milligrams/liter in the wastewater in the last compartment at the effluent end of the elongate tank whereby biodegradation of the waste material in the wastewater is aerobic, the means for maintaining a dissolved oxygen content in the wastewater including; a plurality of rotating biological contactor units, one or more of the rotating biological contactor units being located within each of the compartments of the elongate tank, at least a portion of the rotating biological contactor units in the last compartment extending above the surface of the wastewater in the last compartment;
    a secondary clarifier tank equipped with sludge collection means; and
    means for connecting the effluent end of the elongate tank to the secondary clarifier tank to deliver effluent from the effluent end of the elongate tank to the secondary clarifier tank;
    means for supplying waste sludge from the sludge collection means of the secondary clarifier tank directly into at least the last compartment of the elongate tank near the effluent end of the elongate tank to add flocculation nuclei to the wastewater contained in the effluent end of the elongate tank to cause flocculation of the suspended solids, enhance solid settling and separation, and lower turbidity in said secondary clarifier tank.

2. The apparatus defined in claim 1 wherein the means for supplying waste sludge diverts sludge solely into the last compartment of the elongate tank.

3. In a method for treating wastewater, a method of increasing solids contact and thus enhancing solids settling comprising:
    providing a source of effluent wastewater containing suspended solid matter from a primary clarifying means;
    transporting the effluent wastewater into a sequentially chambered tank equipped with at least one rotating biological contactor unit in each chamber, the chambers including a first chamber and a last chamber; at least a portion of the rotating biological contactor units in the last chamber extending above the surface of the wastewater in the last chamber;
    providing means in the sequentially chambered tank for causing effluent to sequentially pass from the first chamber to the last chamber;
    maintaining a dissolved oxygen content of at least 0.5 milligrams/liter in the wastewater in the last chamber to provide for aerobic biodegration of the waste material in the wastewater;
    transporting the effluent from the last chamber to a secondary clarifier;

separating settleable solids from the effluent in the form of a sludge;

collecting the sludge in a portion of the secondary clarifier;

conveying the majority of the collected sludge to a waste sludge disposal means; and diverting the remaining portion of the collected sludge directly to at least the last chamber of the tank to thereby enhance the flocculation of the suspended solids in the wastewater and to effect increased setteability of the solids in the secondary clarifier.

4. The method defined in claim 3 wherein the suspended solids are comprised of organic and inorganic materials.

5. The method defined in claim 3 wherein the remaining portion of waste sludge is diverted solely into said last chamber of the rotating biological contactor tank.

6. The method defined in claim 3 wherein the remaining portion of waste sludge is diverted into the last two chambers of the tank.

* * * * *